United States Patent
Chen et al.

(10) Patent No.: US 9,839,009 B2
(45) Date of Patent: Dec. 5, 2017

(54) METHODS AND APPARATUS FOR PROCESSING CONTROL AND/OR SHARED CHANNELS IN LONG TERM EVOLUTION (LTE)

(71) Applicant: QUALCOMM Incorporated, San Diego, CA (US)

(72) Inventors: Wanshi Chen, San Diego, CA (US); Peter Gaal, San Diego, CA (US); Stefan Geirhofer, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/948,247

(22) Filed: Jul. 23, 2013

(65) Prior Publication Data

US 2014/0036804 A1 Feb. 6, 2014

Related U.S. Application Data (60) Provisional application No. 61/679,384, filed on Aug. 3, 2012, provisional application No. 61/721,947, filed on Nov. 2, 2012.

(51) Int. Cl.
*H04W 4/00* (2009.01)
*H04W 72/04* (2009.01)
*H04L 5/00* (2006.01)

(52) U.S. Cl.
CPC ....... *H04W 72/0406* (2013.01); *H04L 5/0053* (2013.01)

(58) Field of Classification Search
None
See application file for complete search history.

(56) References Cited

U.S. PATENT DOCUMENTS 6,785,510 B2  8/2004  Larsen
8,428,016 B2  4/2013  Bhattad et al.
(Continued)

FOREIGN PATENT DOCUMENTS

CN  101771443 A  7/2010
CN  101932077 A  12/2010
(Continued)

OTHER PUBLICATIONS

3rd Generation Partnership Project; Technical Specification Group Radio Access Network; Further Advancements for E-UTRA Physical Layer Aspects(Release 9 ), 3GPP Draft; TR 36.814_200, 3rd Generation Partnership Project (3GPP), Mobile Competence Centre; 650, Route Des Lucioles; F-06921 Sophia-Antipolis Cedex; France, vol. RAN WGI, No. San Francisco, USA; 20100222, Apr. 8, 2010 (Apr. 8, 2010), XP050419136, [retrieved on Apr. 8, 2010].

(Continued)

*Primary Examiner* — Otis L Thompson, Jr.
(74) *Attorney, Agent, or Firm* — Patterson & Sheridan, LLP (57) ABSTRACT

Certain aspects provide methods and apparatus for processing a control channel and/or a shared channel in a subframe based on a determination that one or more channel properties of the two channels are substantially the same. One example method generally includes receiving a control channel and a shared channel within a subframe; determining that one or more channel properties of the control channel and the shared channel in the subframe are substantially the same; and processing the control channel and the shared channel based on the determination. In this manner, estimations determined for a first channel may be assumed for a second channel whose channel properties are substantially the same as the first channel, rather than by separately (Continued)

determining the estimations for the second channel, thereby saving processing time.

116 Claims, 6 Drawing Sheets

(56) References Cited

U.S. PATENT DOCUMENTS

| | | | |
|---|---|---|---|
| 2011/0044261 A1 | 2/2011 | Cai et al. | |
| 2011/0255483 A1 | 10/2011 | Xu et al. | |
| 2011/0255505 A1* | 10/2011 | Liu et al. | 370/330 |
| 2012/0113827 A1 | 5/2012 | Yamada et al. | |
| 2013/0003604 A1* | 1/2013 | Blankenship | H04L 5/0053 370/255 |
| 2013/0044727 A1* | 2/2013 | Nory et al. | 370/330 |
| 2013/0094458 A1 | 4/2013 | Sartori et al. | |
| 2013/0114495 A1 | 5/2013 | Chen et al. | |
| 2013/0163530 A1* | 6/2013 | Chen | H04W 72/04 370/329 |
| 2013/0188558 A1* | 7/2013 | Nam | H04W 24/02 370/328 |
| 2013/0188566 A1* | 7/2013 | Zhu et al. | 370/329 |
| 2013/0194931 A1* | 8/2013 | Lee et al. | 370/241 |
| 2013/0242885 A1* | 9/2013 | Zhu et al. | 370/329 |
| 2013/0242886 A1* | 9/2013 | Chen et al. | 370/329 |
| 2013/0242947 A1* | 9/2013 | Chen et al. | 370/335 |
| 2013/0279437 A1* | 10/2013 | Ng | H04W 48/16 370/329 |
| 2013/0308572 A1* | 11/2013 | Sayana et al. | 370/329 |
| 2013/0343299 A1* | 12/2013 | Sayana | H04B 7/0417 370/329 |
| 2014/0029584 A1* | 1/2014 | Qu et al. | 370/336 |
| 2014/0092827 A1* | 4/2014 | Jongren | H04L 5/0053 370/329 |
| 2014/0133395 A1* | 5/2014 | Nam et al. | 370/328 |
| 2015/0055581 A1* | 2/2015 | Janis | H04B 7/046 370/329 |
| 2015/0078271 A1* | 3/2015 | Kim | H04B 7/0417 370/329 |
| 2015/0117350 A1* | 4/2015 | Seo | H04L 1/06 370/329 |

FOREIGN PATENT DOCUMENTS

| | | |
|---|---|---|
| CN | 102457452 A | 5/2012 |
| EP | 2378698 A2 | 10/2011 |
| EP | 2437422 A1 | 4/2012 |
| WO | 2010006289 | 1/2010 |
| WO | 2013044657 A1 | 4/2013 |

OTHER PUBLICATIONS

Partial International Search Report—PCT/US2013/051800—ISA/EPO—dated Oct. 23, 2013.
International Search Report and Written Opinion—PCT/US2013/051800—ISA/EPO—dated Dec. 17, 2013.

* cited by examiner

METHODS AND APPARATUS FOR PROCESSING CONTROL AND/OR SHARED CHANNELS IN LONG TERM EVOLUTION (LTE)

CLAIM OF PRIORITY UNDER 35 U.S.C. §119

This application claims benefit of U.S. Provisional Patent Application No. 61/679,384, filed Aug. 3, 2012 and entitled "Methods and Apparatus for Processing Control and Shared Channels in LTE," and U.S. Provisional Patent Application No. 61/721,947, filed Nov. 2, 2012 and entitled "Methods and Apparatus for Processing Control and/or Shared Channels in LTE," both of which are herein incorporated by reference in their entireties.

BACKGROUND

I. Field

Certain aspects of the present disclosure generally relate to wireless communications and, more particularly, to methods and apparatus for processing a control channel and/or a shared channel by determining that characteristics of the control channel and the shared channel may be assumed to be the same, thereby saving processing time.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

In an aspect of the disclosure, a method for wireless communications is provided. The method generally includes receiving a control channel and a shared channel within a subframe, determining that one or more channel properties of the control channel and the shared channel in the subframe are substantially the same, and processing the control channel and the shared channel based on the determination.

In an aspect of the disclosure, an apparatus for wireless communications is provided. The apparatus generally includes means for receiving a control channel and a shared channel within a subframe, means for determining that one or more channel properties of the control channel and the shared channel in the subframe are substantially the same, and means for processing the control channel and the shared channel based on the determination.

In an aspect of the disclosure, a computer program product is provided. The computer program product generally includes a computer-readable medium having code for receiving a control channel and a shared channel within a subframe, for determining that one or more channel properties of the control channel and the shared channel in the subframe are substantially the same, and for processing the control channel and the shared channel based on the determination.

In an aspect of the disclosure, an apparatus for wireless communications is provided. The apparatus generally includes a receiver and a processing system. The receiver is typically configured to receive a control channel and a shared channel within a subframe. The processing system is generally configured to determine that one or more channel properties of the control channel and the shared channel in the subframe are substantially the same; and to process the control channel and the shared channel based on the determination.

In an aspect of the disclosure, a method for wireless communications is provided. The method generally includes receiving a shared channel within a subframe, determining the same precoding may be used across resource blocks belonging to the same precoding resource block group of the shared channel, and processing the shared channel based on the determination.

In an aspect of the disclosure, an apparatus for wireless communications is provided. The apparatus generally includes a receiver and a processing system. The receiver is typically configured to receive a shared channel within a subframe. The processing system is generally configured to determine the same precoding may be used across resource blocks belonging to the same precoding resource block group of the shared channel and to process the shared channel based on the determination.

In an aspect of the disclosure, an apparatus for wireless communications is provided. The apparatus generally includes means for receiving a shared channel within a subframe, means for determining the same precoding may be used across resource blocks belonging to the same precoding resource block group of the shared channel, and means for processing the shared channel based on the determination.

In an aspect of the disclosure, a computer program product is provided. The computer program product generally includes a computer-readable medium having code for receiving a shared channel within a subframe, for determining the same precoding may be used across resource blocks belonging to the same precoding resource block group of the shared channel, and for processing the shared channel based on the determination.

Numerous other aspects are provided including methods, apparatus, systems, computer program products, and processing systems.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

An Example Wireless Communication System

Figure 1:
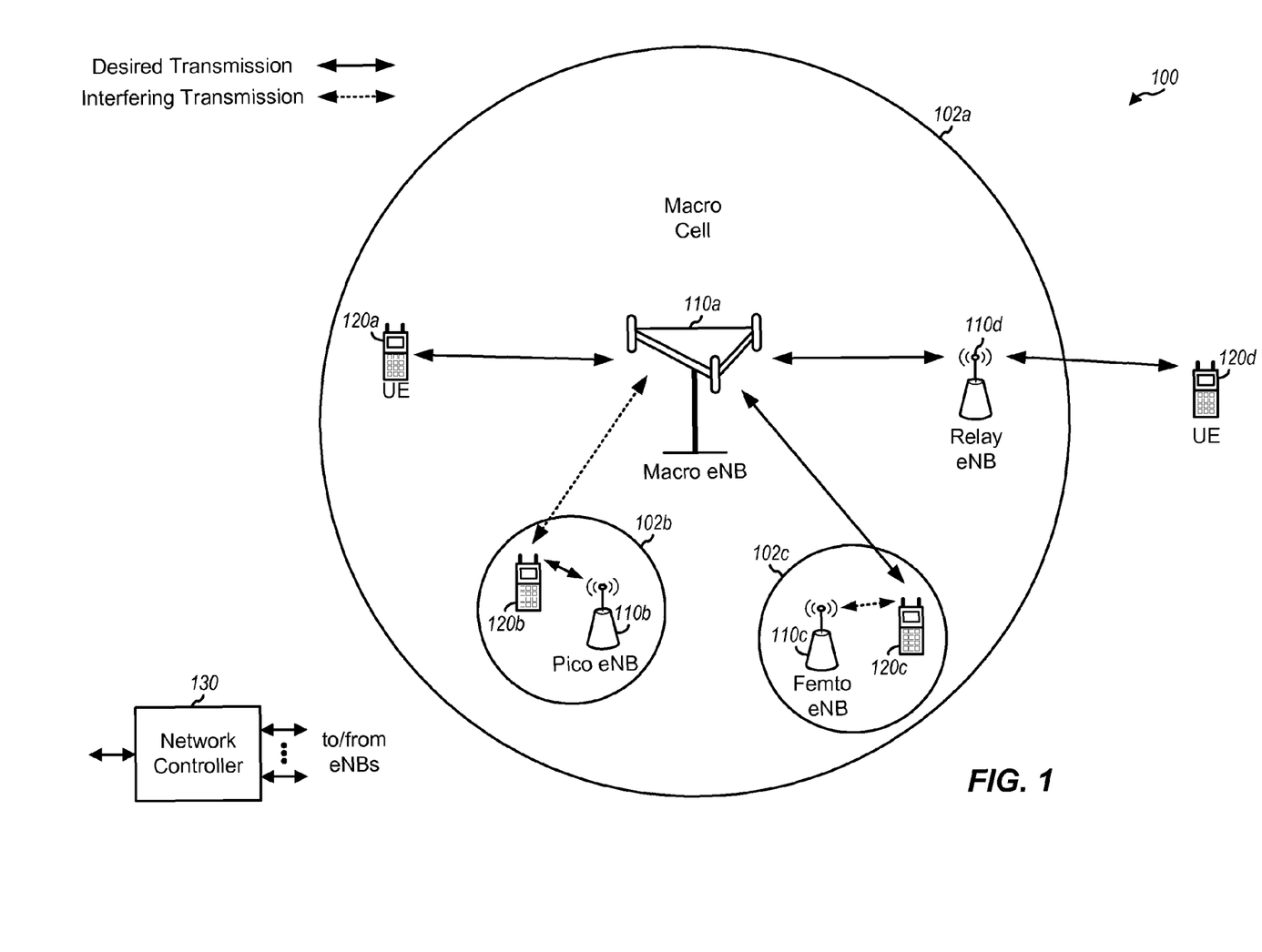
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, etc.

Figure 2:
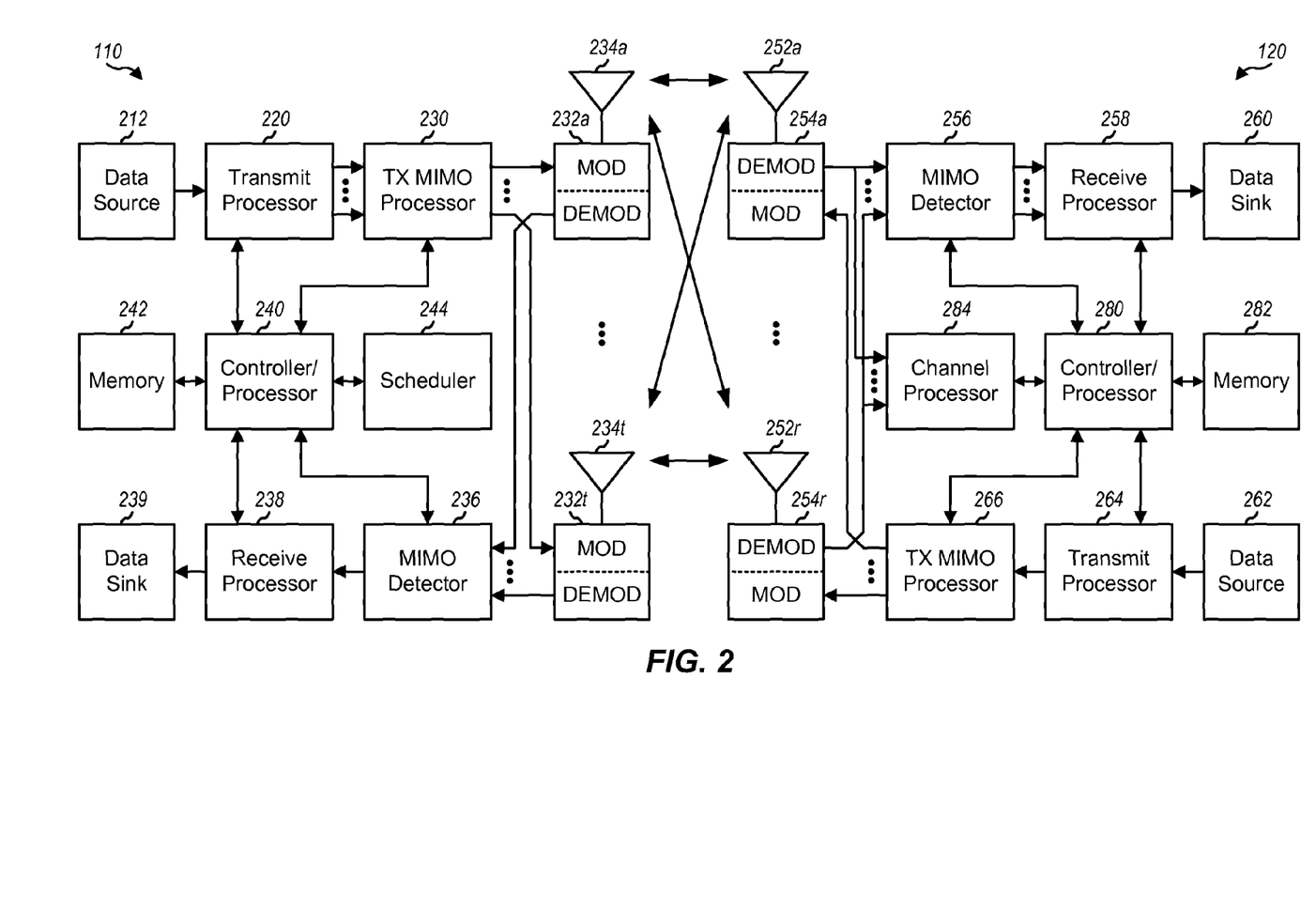
FIG. 2 is a block diagram conceptually illustrating an example of an evolved node B (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254*a* through 254*r* (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

As will be described in further detail below, when transmitting data to the UE 120 the base station 110 may be configured to determining a bundling size based at least in part on a data allocation size and precoded data in bundled contiguous resource blocks of the determined bundling size, wherein resource blocks in each bundle are precoded with a common precoding matrix. That is, reference signals such as UE-RS and/or data in the resource blocks are precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
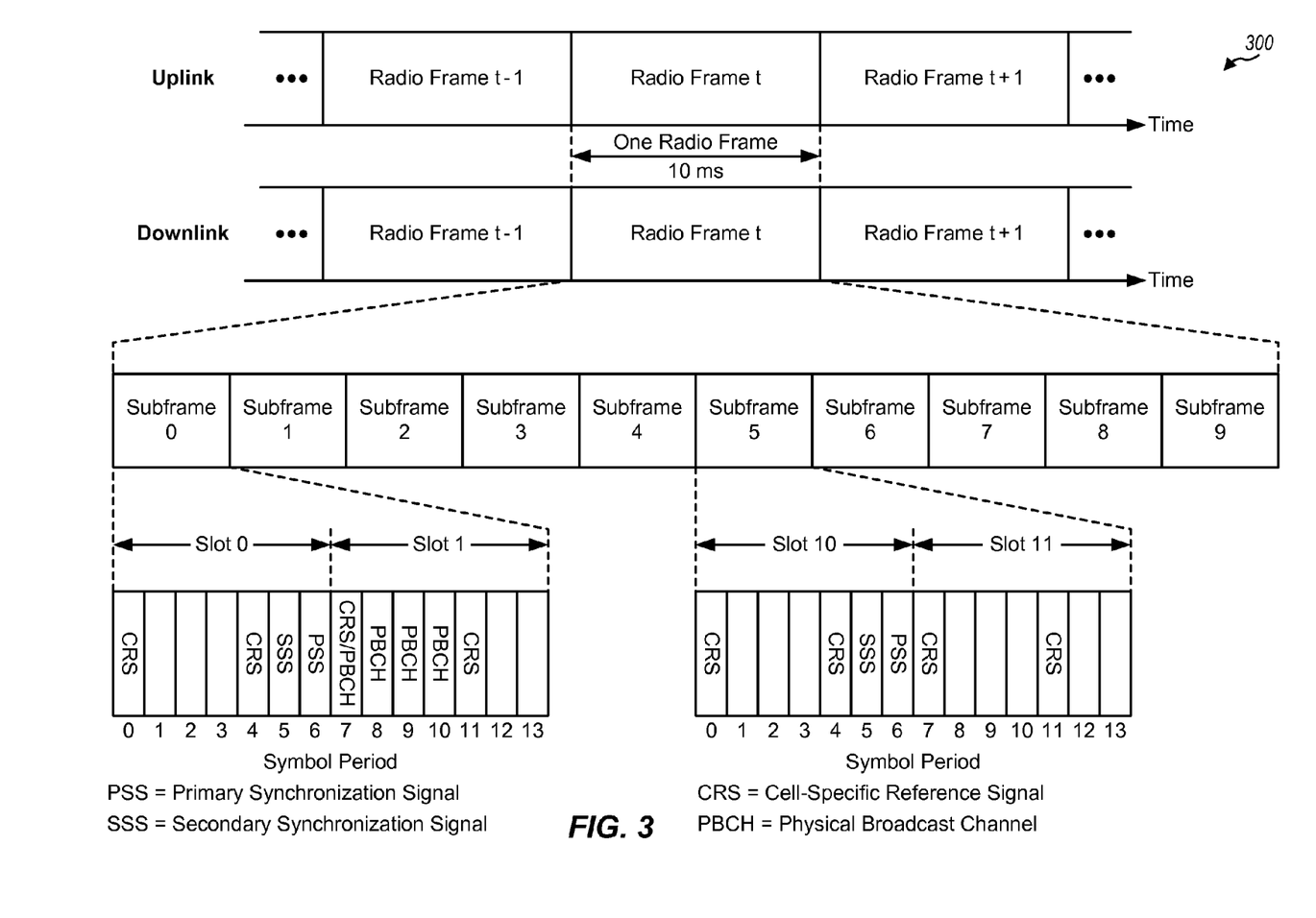
FIG. 3 is a block diagram conceptually illustrating an example of a frame structure in a wireless communications network, in accordance with certain aspects of the present disclosure.

FIG. 3 shows an example frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

An Example Processing of Control and/or Shared Channels

In Long Term Evolution Release 11 (LTE Rel-11), for example, coordinated multipoint (CoMP) transmission schemes may be supported, which refer to schemes where multiple base stations coordinate transmissions to (e.g., downlink (DL) CoMP) or receptions from (e.g., uplink (UL) CoMP) one or more UEs. DL CoMP and UL CoMP may be separately or jointly enabled for a UE.

There are several examples of CoMP schemes. For example, there is joint transmission (JT) (e.g., DL CoMP), where multiple eNBs transmit the same data intended for a UE. There is also joint reception (JR) (e.g., UL CoMP), where multiple eNBs receive the same data from a UE; coordinated beamforming (CBF), in which an eNB transmits to its UE using beams that are chosen to reduce interference to UEs in neighboring cells; and dynamic point(s) selection (DPS), in which the cell(s) involved in data transmissions may change from subframe to subframe.

CoMP may exist in homogeneous networks and/or heterogeneous networks (HetNet). The connection between the nodes involved in CoMP may be via the X2 backhaul (e.g., with some latency and limited bandwidth) or via fiber (e.g., with minimum latency and "unlimited" bandwidth). In HetNet CoMP, low power nodes may also be referred to as remote radio heads (RRHs).

To improve CoMP operation, PDSCH demodulation reference signal (DM-RS) sequence initialization may be based on some virtual cell identifiers (IDs), instead of physical cell identifiers (PCIs) as in LTE Rel-8/9/10, for example:

$$c_{init} = (\lfloor n_s/2 \rfloor + 1) \cdot (2X+1) \cdot 2^{16} + n_{SCID}.$$

Two candidate values of X may be configured: x(0) and x(1), as compared with PCI in LTE Rel-8/9/10, for example. $n_{SCID}$, which may be indicated by or indicate the scrambling identity, may be reused for dynamic selection of x(0) or x(1) for rank 1 and 2. Note that $n_{SCID}$ equals 0 for rank larger than 2 when x(0) is used. The value range of x(n) (0≤n≤2) is 0 to 503.

In LTE Rel-8/9/10, for example, the physical downlink control channel (PDCCH) may be located in the first several symbols of a subframe. PDCCH may be fully distributed in the entire system bandwidth. PDCCH may be time-division multiplexed with the physical downlink shared channel (PDSCH). Effectively, in LTE Rel-8/9/10, for example, a subframe may be divided into a control region and a data region.

In LTE Rel-11, for example, a new control channel (e.g., enhanced PDCCH (ePDCCH)) may be introduced. Unlike the legacy PDCCH, which occupies the first several control symbols in a subframe, ePDCCH may occupy the data region, similar to PDSCH. ePDCCH may help increase control channel capacity, support frequency-domain inter-cell interference coordination (ICIC), achieve improved spatial reuse of control channel resources, support beamforming and/or diversity, operate on the new carrier type and in multimedia broadcast single frequency network (MB-SFN) subframes, and coexist on the same carrier as legacy UEs.

Figure 4:
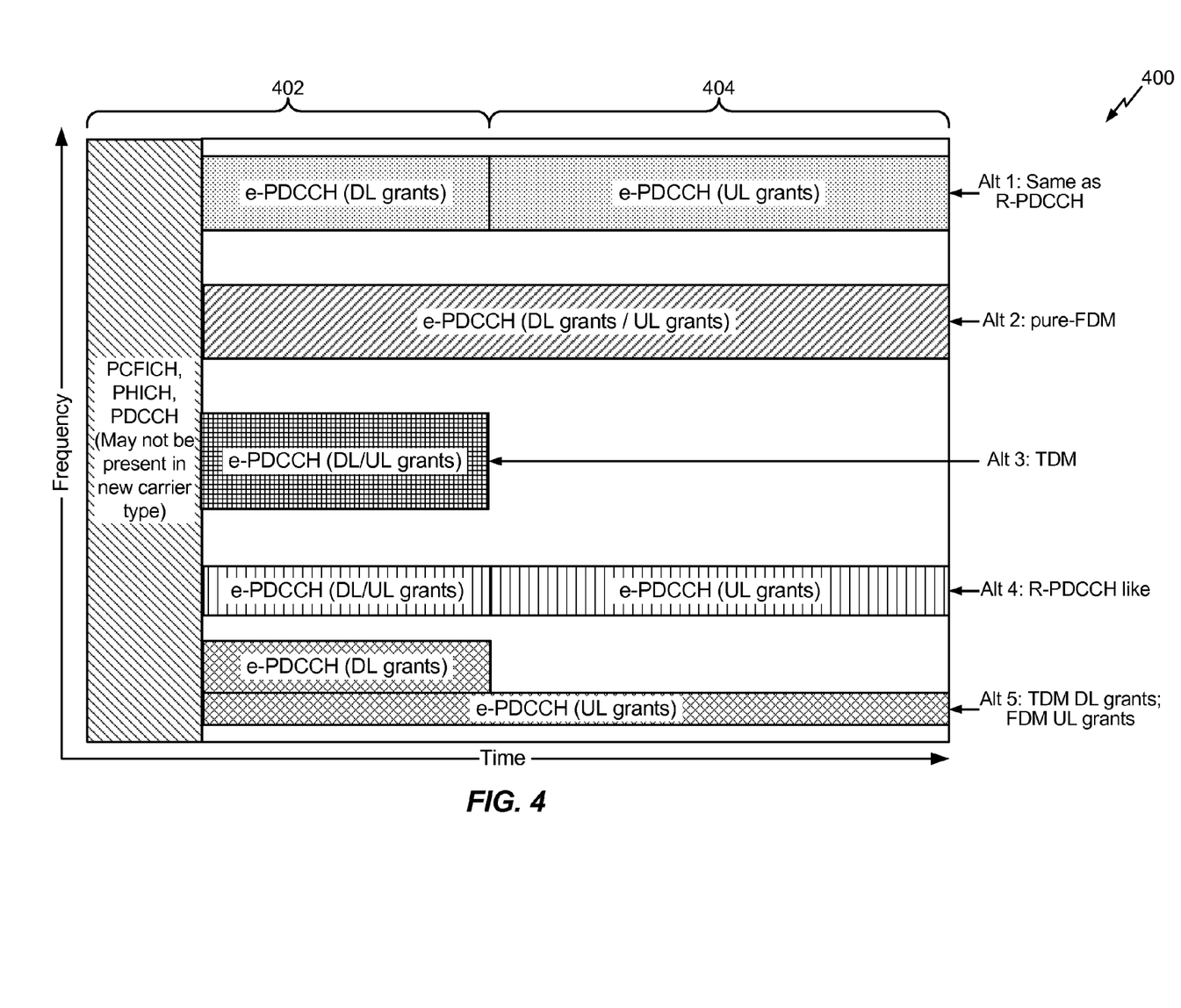
FIG. 4 illustrates an example subframe with various options for an enhanced physical downlink control channel (ePDCCH), in accordance with certain aspects of the present disclosure.

FIG. 4 illustrates an example subframe 400 with various options for ePDCCH, in accordance with certain aspects of the present disclosure. The subframe 400 is divided into a first slot 402 and a second slot 404, wherein each slot typically comprises 7 symbols in LTE for the normal cyclic prefix (CP) case. Each subframe in LTE spans 1 ms, and therefore, each slot has a duration of 0.5 ms. The first 3 symbols of the subframe 400 may be used for the Physical Control Format Indicator Channel (PCFICH), the Physical HARQ (Hybrid Automatic Repeat Request) Indicator Channel (PHICH), and PDCCH. Various ePDCCH structures are available for conveying information in the subframe 400, as illustrated.

With regards to ePDCCH, both localized and distributed transmission of the enhanced control channel may be supported. DM-RS-based ePDCCH may also be supported, for which antenna ports 107, 108, 109, and 110 may be used, for example, whereas PDSCH may utilize antenna ports 7-14, for example.

For certain aspects, ePDCCH may be frequency-domain multiplexing (FDM)-based. In other words, ePDCCH may span both first and second slots with a restriction on the maximum number of transport channel (TrCH) bits receivable in a transmission time interval (TTI) (e.g., to relax the processing demands for the UE). Details of how and when to restrict the maximum number of TrCH bits receivable in a TTI may be provided (e.g., when round trip time (RTT)>100 µs or according to UE capability). Multiplexing of PDSCH and ePDCCH within a physical resource block (PRB) pair may not be permitted.

The same scrambling sequence generator defined for PDSCH DM-RS may be used for ePDCCH DM-RS. The scrambling sequence generator of DM-RS for ePDCCH on antenna ports 7-10 may be initialized by $$c_{init} = (\lfloor n_s/2 \rfloor + 1) \cdot (2X+1) \cdot 2^{16} + n_{SCID}.$$

Details of $n_{SCID}$ and X are outside the scope of this disclosure.

Antenna ports may or may not be co-located. Common reference signals (CRSs) may be assumed as "quasi co-located" by the UE. As used herein, the term "quasi co-located" generally refers to one or more long-term channel properties (e.g., delay spread, receive power, frequency shift, Doppler spread, and receiver timing) within a serving cell being substantially the same (e.g., within tolerances). For example, two antenna ports are said to be quasi co-located if the large-scale properties of the channel over which a symbol on one antenna port is conveyed can be inferred from the channel over which a symbol on the other antenna port is conveyed.

As a baseline, DM-RS for PDSCH may be assumed as quasi co-located. Within a channel state information reference signal (CSI-RS) resource, there may be a working assumption for certain aspects: for a CoMP resource management set, CSI-RS ports may be assumed as quasi co-located. Between CSI-RS resources, for a CoMP resource management set and a CoMP measurement set, CSI-RS ports may not be assumed as quasi co-located, at least with respect to certain properties such as delay spread, reception power, frequency shift, and/or Doppler spread.

Since ePDCCH and PDSCH are defined to have different antenna port indices, one issue for certain aspects of the present disclosure is whether a UE may assume any quasi co-location between ePDCCH and PDSCH in a subframe. Such a quasi co-location assumption may impact channel estimation, receiver timing estimation, Doppler estimation, frequency shift estimation, etc., and consequently, may impact both ePDCCH and PDSCH performance.

According to certain aspects of the present disclosure, the UE may determine whether ePDCCH and PDSCH are quasi co-located in a subframe based on some implicit or explicit signaling. As an example of explicit signaling, radio resource control (RRC) signaling or dynamic signaling (e.g., conveyed in a control channel, such as the ePDCCH itself) may be used. Implicit signaling may be based on cell ID (e.g., virtual cell ID) configurations, for example. If both ePDCCH and PDSCH use the same cell ID in a subframe, the UE determines that ePDCCH and PDSCH are quasi co-located; otherwise, the UE determines that ePDCCH and PDSCH are not quasi co-located.

Based on the determination above, the UE performs ePDCCH and PDSCH decoding accordingly. If ePDCCH and PDSCH are not quasi co-located, the UE performs separate ePDCCH and PDSCH decoding. Otherwise, for channel estimation, the same channel estimation may be applied to both channels. The UE may assume that ePDCCH and PDSCH possess the same receiver timing, frequency shift, etc. For certain aspects, using the same channel estimation may refer to estimations for corresponding antenna ports (e.g., ports 7 and 107, 8 and 108, 9 and 109, or 10 and 110, respectively).

Using the same channel estimation for both ePDCCH and PDSCH may further depend on ePDCCH type and PDSCH type. For closed-loop-beamforming-based ePDCCH and closed-loop-beamforming-based PDSCH, using the same channel estimation may be applicable if the corresponding ePDCCH resource block(s) (RB) and PDSCH RB(s) belong to the same precoding RB group (or the same PRB pair). For open-loop-beamforming based ePDCCH and open-loop-beamforming based PDSCH, using the same channel estimation may be applicable. Using the same channel estimation is not applicable for different beamforming types between ePDCCH and PDSCH.

According to certain aspects, the signaling of quasi co-location assumption indications may be associated with a set of RRC-configured states. For example, for PDSCH, one or more states (e.g., quasi co-location states) may be defined, which indicate "quasi co-location" with a specific non-zero power (NZP) CSI-RS resource in the CoMP measurement set. For PDSCH demodulation, the UE may be informed through dynamic Downlink Control Information (DCI) signaling of the predefined state for a given subframe. The aforementioned states may not only be used for quasi co-location signaling; for example; they may also be combined with other system parameters, such as rate-matching parameters. Therefore, in general, there may be more states configured than there are quasi co-location assumptions. Multiple states corresponding to the same quasi co-location assumptions may be defined.

A similar signaling paradigm may be followed for ePDCCH. Instead of relying on dynamic signaling, the aforementioned states may be associated with RRC-configured ePDCCH sets (e.g., of resources). For example, two ePDCCH sets may be defined, and each set may be linked through RRC configuration to one quasi co-location indication state.

In one aspect, the above concepts may be used for signaling the quasi co-location assumption indications between PDSCH and ePDCCH. Specifically, an ePDCCH set may be linked with a PDSCH state through an RRC configuration. Quasi co-location may then be assumed between PDSCH and ePDCCH if, in a given subframe, both PDSCH and ePDCCH are associated with the same state.

In another aspect, if there is no direct linkage between one or more ePDCCH sets and one or more PDSCH states, the ePDCCH may be associated directly with a specific NZP CSI-RS resource in the CoMP measurement set, similar to the way that PDSCH quasi co-location states are defined. In a given subframe, quasi co-location between PDSCH and ePDCCH may then be assumed if both are associated with the same NZP CSI-RS resource. In yet another aspect, quasi co-location among PDSCH and ePDCCH may not imply that both use the same precoding; therefore, channel estimation for PDSCH DM-RS and ePDCCH DM-RS ports may not be identical. On the other hand, there are scenarios in which the same precoding may be applied. If this same-precoding assumption indeed holds, it is beneficial to inform the UE about this assumption in an effort to enable the UE to enhance channel estimation, and ultimately decoding performance, accordingly. Since the assumption may not hold universally, it is desirable to provide some additional signaling to indicate such an assumption. This signaling may, for example, be performed through RRC signaling by tying the indication to the aforementioned linkage between ePDCCH and one or more PDSCH states. In its simplest form, this indication may be binary, indicating whether, in addition to quasi co-location, a same-precoding assumption may also be made. If so, the UE may then make the assumption that precoding is identical, for example, for the following port combinations within a precoding RB group: (e.g., ports 7 and 107, 8 and 108, 9 and 109, and 10 and 110).

It is important to note that the above signaling mechanism may provide a dynamic indication to the UE of whether or not to assume same precoding, even though the aforementioned binary indication is transmitted through semi-static RRC signaling. This is possible, for example, by configuring multiple PDSCH states. Quasi co-location may then be disabled in a given subframe, for example, by transmitting PDSCH using a different PDSCH state that maps to the same NZP CSI-RS resource.

In cases where the UE is not provided with quasi co-location indication signaling that is associated with a specific NZP CSI-RS resource, the binary indication described above may still be configured to determine whether or not the UE may make the same-precoding assumption.

According to certain aspects, the UE may most likely be signaled whether or not a same-precoding assumption may be made for PDSCH transmissions across resource blocks belonging to the same precoding RB group. As used herein, the case where the same-precoding assumption may be made for PDSCH is generally referred to as "PDSCH bundling." In transmission mode 9 (TM9), where CSI feedback is provided for only one cell, the PDSCH bundling indication may be tied to the CSI feedback configuration: if a UE is configured with Precoding Matrix Indicator (PMI) feedback, the UE is expected to assume PDSCH bundling within a precoding RB group; otherwise, the UE may not make such an assumption.

In transmission mode 10 (TM10), a different form of signaling may be used because PMI feedback is configurable on a per-CSI-process basis. Since TM10 supports more than a single CSI process, it is unclear what assumption should be made by the UE if at least one CSI process is configured with PMI reporting, but at least one other is configured without PMI reporting. Various suitable schemes for performing such signaling are described below.

In one aspect, whether or not PDSCH bundling may be assumed may be signaled as part of a PDSCH state. For example, a state may be associated with an RRC-configured bit that indicates whether or not bundling may be assumed. When the UE receives a PDSCH transmission, the UE is informed through the grant of the PDSCH state. The above signaling may therefore provide the UE with a dynamic indication of whether or not to assume PDSCH bundling. If a UE is scheduled with the compact DCI format 1A (e.g., instead of DCI format 2D), no indication of the state may be provided. In this case the UE may be informed of the bundling assumption through RRC signaling, or whether PDSCH bundling may be assumed may be predetermined in the wireless standard.

In another aspect, the signaling of the PDSCH bundling assumption indication may be associated with a UE's configured NZP CSI-RS resources. In this case, each configured NZP CSI-RS resource in the CoMP measurement set may be associated with a bit that indicates whether or not bundling should be assumed. In a given subframe, the UE may determine the bundling assumption according to the bit that is associated with the NZP CSI-RS resource, which is also to be assumed for quasi co-location. If no such NZP CSI-RS resource is signaled (e.g., when the UE is scheduled through a compact DCI format), then a predetermined or otherwise signaled assumption indication may be used.

In yet another aspect, the signaling of the PDSCH bundling assumption indication may be performed in an implicit manner using a three-step approach, for example. First, in a given subframe, the UE may determine the NZP CSI-RS resource which is to be assumed for quasi co-location, similar to the scheme described above. Second, the UE may determine the set of CSI processes that are associated with this NZP CSI-RS resource. Third, if the set comprises a single CSI process, the UE may derive the PDSCH bundling assumption depending on whether or not the single CSI process is configured with or without PMI reporting (e.g., if configured with PMI reporting, bundling is assumed; otherwise, bundling is not assumed). If the set does not contain exactly one CSI process, the UE may make a predetermined assumption, or the UE behavior may be left unspecified.

In yet another aspect, the PDSCH bundling assumption may be made in accordance with a single RRC-configured bit that determines whether or not the UE should assume PDSCH bundling across subframes. Alternatively, this determination may also be made implicitly by assuming PDSCH bundling if the majority of CSI processes is configured with PMI reporting; otherwise no bundling may be assumed.

In yet another aspect, the aforementioned signaling methods for indicating PDSCH bundling may also be applied to the ePDCCH by performing the signaling per ePDCCH set instead of per PDSCH state. This may be useful in scenarios where the bundling assumption between PDSCH and ePD-CCH is not linked.

Figure 5:
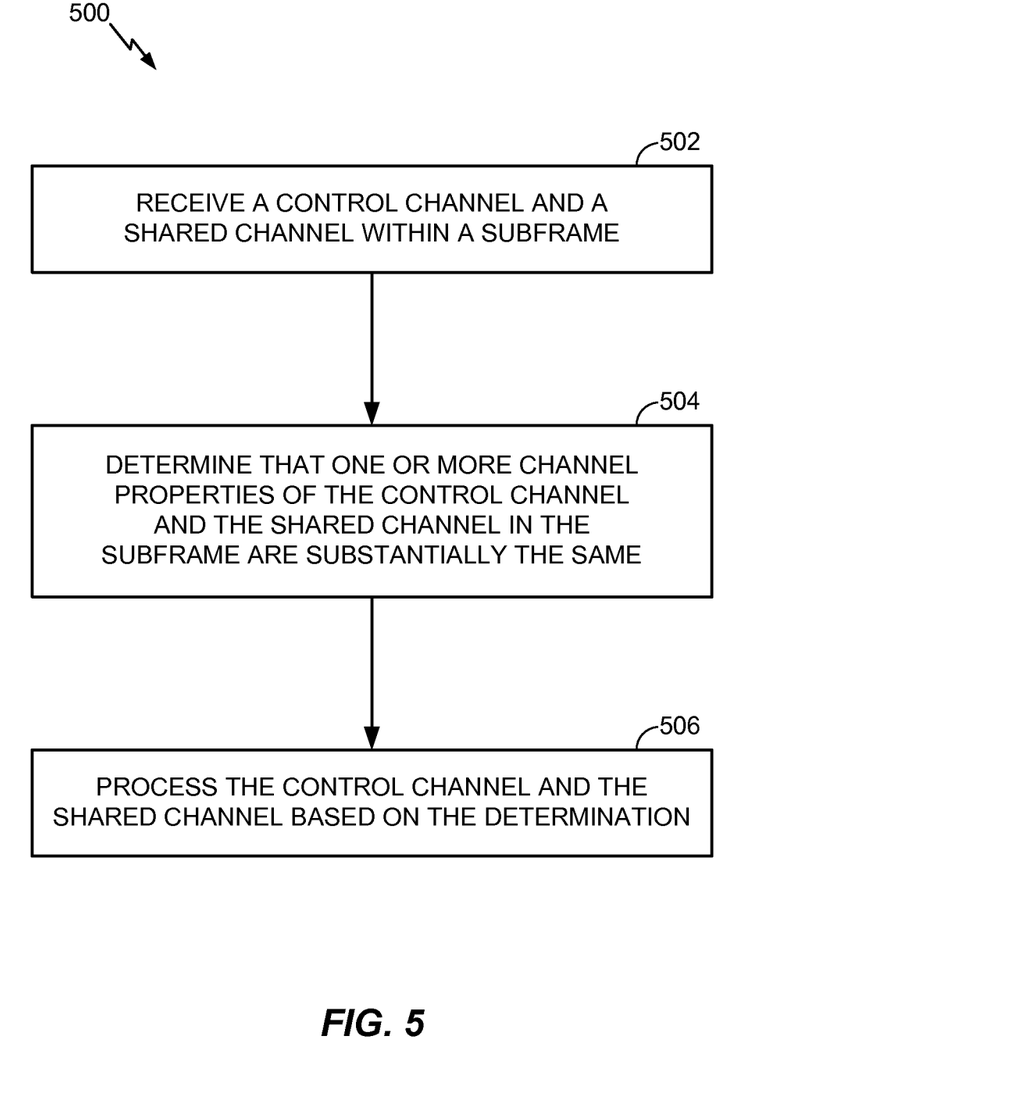
FIG. 5 illustrates example operations for processing a control channel and a shared channel in a subframe based on a determination that one or more channel properties of the two channels are substantially the same, in accordance with certain aspects of the present disclosure.

FIG. 5 illustrates example operations 500 for processing a control channel and a shared channel in a subframe based on a determination that one or more channel properties of the two channels are substantially the same, in accordance with certain aspects of the present disclosure. The operations 500 may be performed, for example, by a UE.

At 502, the UE may receive a control channel and a shared channel within a subframe. At least a first portion of the control channel or of the shared channel may be from a serving base station. For certain aspects, at least a second portion of the control channel or of the shared channel may be from a non-serving base station.

At 504, the UE may determine that one or more channel properties of the control channel and of the shared channel are substantially the same (e.g., that the control channel and the shared channel are quasi co-located in the subframe). For certain aspects, the one or more channel properties include at least one of a delay spread, a receive power, a frequency shift, a Doppler spread, or a receiver timing.

According to certain aspects, determining that the one or more channel properties of the control channel and of the shared channel are substantially the same entails receiving an explicit indication that channel properties are substantially the same. In this case, the explicit indication may include at least one of radio resource control (RRC) signaling or a signal conveyed in the control channel. For other aspects, determining that the one or more channel properties of the control channel and of the shared channel are substantially the same involves using an implicit indication that the channel properties are substantially the same. In this case, using the implicit indication may include determining that both the control channel and the shared channel use effectively the same cell identifiers (IDs) in the subframe. Each cell ID may be a virtual cell ID, separately configured from a physical cell ID (PCI) associated with a cell.

At 506, the UE may process the control channel and the shared channel based on the determination. According to certain aspects, processing the control channel and the shared channel at 506 involves using the same channel estimation for both the control channel and the shared channel. For certain aspects, using the same channel estimation for both the control channel and the shared channel entails using the same channel estimation for corresponding antenna ports between the control and shared channels. For certain aspects, using the same channel estimation includes using the same channel estimation (only) if the corresponding resource blocks between the control and the shared channels belong to the same precoding resource block group (or the same PRB pair) and the control and the shared channels are closed-loop-beamforming-based control and shared channels. For certain aspects, the control and the shared channels are open-loop-beamforming-based control and shared channels. According to certain aspects, the control and the shared channels are determined to be quasi co-located. For certain aspects, processing the control channel and the shared channel involves using at least one of the same timing estimation, the same frequency estimation, or the same Doppler spread estimation for both the control channel and the shared channel.

For certain aspects, the control channel includes an ePDCCH, and the ePDCCH uses at least one of antenna ports 107-110. According to certain aspects, the shared channel includes a PDSCH. The PDSCH may use at least one of antenna ports 7-14.

According to certain aspects, determining that the one or more channel properties of the control channel and of the shared channel are substantially the same is further dependent on one or more characteristics associated with at least one of the control channel or the shared channel. These characteristics may include at least one of a search space, a downlink control information (DCI) format, an aggregation level, a decoding candidate within the aggregation level, closed loop or open loop beamforming, localized or distributed resource allocation, a radio network temporary identifier (RNTI) type, or subframe indices associated with the control channel. These characteristics may include at least one of unicast or broadcast transmission, closed-loop or open-loop beamforming, localized or distributed resource allocation, a RNTI type, or subframe indices associated with the shared channel. For certain aspects, the one or more channel properties of the control channel and of the shared channel are determined to be substantially the same if the shared channel is a broadcast channel. The broadcast channel may be scrambled by one of a paging RNTI, a system information RNTI, or a random access RNTI.

According to certain aspects, the receiving at 502 includes receiving at least one of RRC signaling or a signal conveyed in the control channel indicating one of a set of RRC-configured states. In this case, the determining at 504 involves using the at least one of the RRC signaling or the signal. The at least one of the RRC signaling or the signal may also include one or more system parameters.

According to certain aspects, determining that the one or more channel properties of the control channel and of the shared channel are substantially the same at 504 is based on an RRC-configured resource set associated with the control channel. The determination at 504 may further be based on a shared channel state associated with the RRC-configured resource set. For certain aspects, the processing of the control channel and the shared channel at 506 may include employing the same precoding for the control channel and the shared channel. In such aspects, the signaling may include an indication that an RRC-configured resource set is associated with the control channel.

According to certain aspects, determining that the one or more channel properties of the control channel and of the shared channel are substantially the same at 504 includes determining if both the control channel and the shared channel are associated with the same NZP CSI-RS resource.

Figure 6:
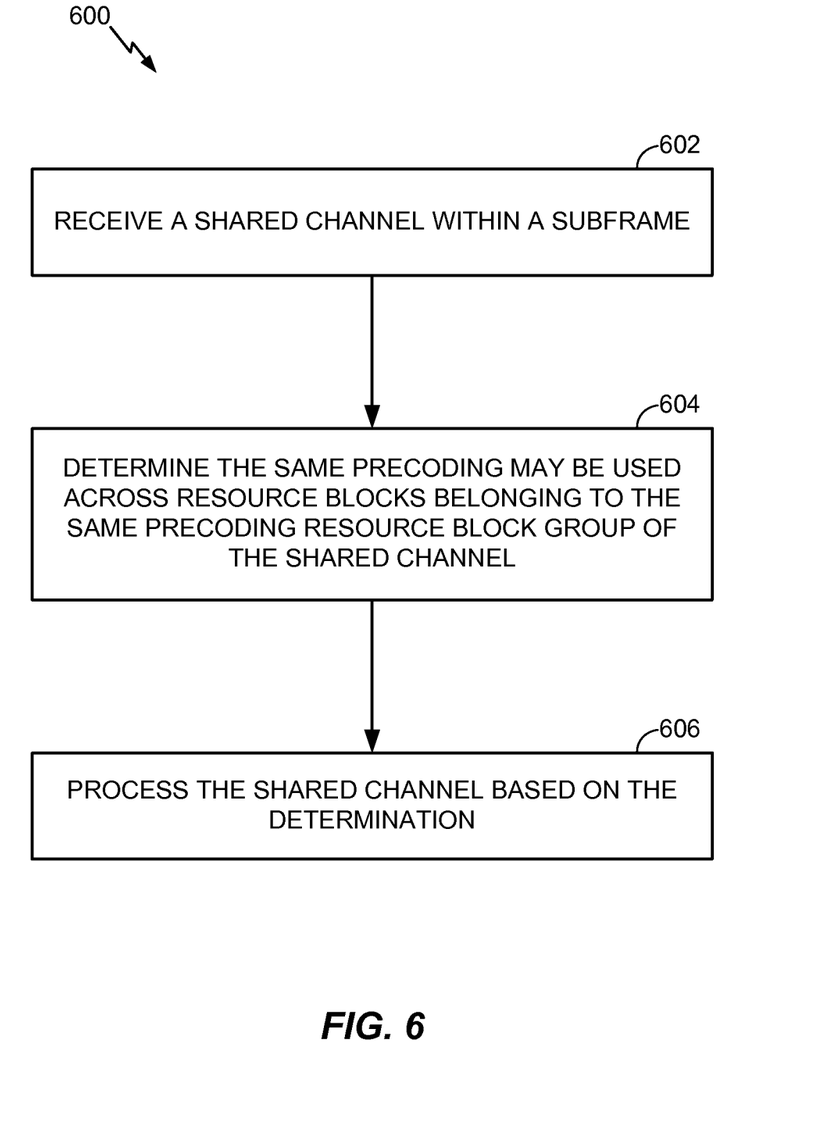
FIG. 6 illustrates example operations for processing a shared channel in a subframe based on a determination that the same precoding may be used across resource blocks belonging to the same precoding resource block group of the shared channel, in accordance with certain aspects of the present disclosure.

FIG. 6 illustrates example operations 600 for processing a shared channel in a subframe based on a determination that the same precoding may be used across resource blocks, in accordance with certain aspects of the present disclosure. The operations 600 may be performed, for example, by a UE.

At 602, the UE may receive a shared channel within a subframe. At 604, the UE may determine that the same precoding may be used across resource blocks belonging to the same precoding resource block group (or to the same PRB pair) of the shared channel. According to certain aspects, the determining is based on a channel state information (CSI) feedback configuration. At 606, the UE may process the shared channel based on the determination.

According to certain aspects, the operations 600 may further involve the UE receiving an explicit or implicit indication that the same precoding may be used across resource blocks belonging to the same precoding resource block group (or to the same PRB pair) of the shared channel. In this case, the determining at 604 may be based on the explicit or implicit indication.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the figures, those operations may be performed by any suitable corresponding counterpart means-plus-function component(s).

For example, means for receiving may include a receiver (e.g., a demodulator 254) and/or an antenna 252 of the UE 120 illustrated in FIG. 2. Means for processing or means for determining, may include a processing system, which may include at least one processor, such as the receive processor 258, the controller/processor 280, and/or the transmit processor 264 of the UE 120 illustrated in FIG. 2. However, additional or alternative components in FIG. 2 may be employed as the means for receiving, means for determining, and/or means for processing.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
   receiving a control channel and a shared channel within a subframe;
   determining that one or more channel properties of the control channel and the shared channel in the received subframe are substantially the same,
      wherein the one or more channel properties comprise at least one of a delay spread, a receive power, a frequency shift, a Doppler spread, or a receiver timing, and
      wherein the determining is based on a radio resource control (RRC)-configured resource set associated with the control channel;
   determining that the control channel and the shared channel are quasi co-located based on the determination that one or more channel properties of the control channel and the shared channel are substantially the same; and
   processing the control channel and the shared channel based on the determination that the control channel and the shared channel are quasi co-located.

2. The method of claim 1, wherein the control channel comprises an enhanced physical downlink control channel (ePDCCH).

3. The method of claim 2, wherein the ePDCCH uses at least one of antenna ports 107-110.

4. The method of claim 1, wherein the shared channel comprises a physical downlink shared channel (PDSCH).

5. The method of claim 4, wherein the PDSCH uses at least one of antenna ports 7-14.

6. The method of claim 1, wherein determining that the one or more channel properties of the control channel and the shared channel are substantially the same comprises receiving an explicit indication that the channel properties are substantially the same.

7. The method of claim 6, wherein the explicit indication comprises at least one of radio resource control (RRC) signaling or a signal conveyed in the control channel.

8. The method of claim 1, wherein determining that the one or more channel properties of the control channel and the shared channel are substantially the same comprises using an implicit indication that the channel properties are substantially the same.

9. The method of claim 8, wherein using the implicit indication comprises determining that both the control channel and the shared channel use effectively the same cell identifiers (IDs) in the subframe.

10. The method of claim 9, wherein each cell ID is a virtual cell ID, separately configured from a physical cell ID associated with a cell.

11. The method of claim 1, wherein processing the control channel and the shared channel comprises using the same channel estimation for both the control channel and the shared channel.

12. The method of claim 11, wherein using the same channel estimation for both the control channel and the shared channel comprises using the same channel estimation for corresponding antenna ports between the control and shared channels.

13. The method of claim 11, wherein using the same channel estimation comprises using the same channel estimation if corresponding resource blocks between the control and the shared channels belong to the same physical resource block pair.

14. The method of claim 1, wherein processing the control channel and the shared channel comprises using the same timing estimation for both the control channel and the shared channel.

15. The method of claim 1, wherein processing the control channel and the shared channel comprises using the same frequency estimation for both the control channel and the shared channel.

16. The method of claim 1, wherein processing the control channel and the shared channel comprises using the same Doppler spread estimation for both the control channel and the shared channel.

17. The method of claim 1, wherein determining that the one or more channel properties of the control channel and the shared channel are substantially the same is further dependent on one or more characteristics associated with at least one of the control channel or the shared channel.

18. The method of claim 17, wherein the characteristics comprise at least one of a search space, a downlink control information (DCI) format, an aggregation level, decoding candidate within the aggregation level, closed loop beamforming, open loop beamforming, localized resource allocation, distributed resource allocation, a radio network temporary identifier (RNTI) type, or subframe indices associated with the control channel.

19. The method of claim 17, wherein the characteristics comprise at least one of unicast transmission, broadcast transmission, closed loop beamforming, open loop beamforming, localized resource allocation, distributed resource allocation, a radio network temporary identifier (RNTI) type, or subframe indices associated with the shared channel.

20. The method of claim 17, wherein the determining that one or more channel properties of the control channel and the shared channel are substantially the same comprises determining that the one or more channel properties of the control channel and the shared channel are substantially the same if the shared channel is a broadcast channel.

21. The method of claim 20, wherein the broadcast channel is scrambled by one of a paging radio network temporary identifier (RNTI), a system information RNTI, or a random access RNTI.

22. The method of claim 1, wherein at least a first portion of the control channel or the shared channel is from a serving base station and at least a second portion of the control channel or the shared channel is from a non-serving base station.

23. The method of claim 1, wherein the receiving comprises receiving at least one of radio resource control (RRC) signaling or a signal conveyed in the control channel indicating one of a set of RRC-configured states and wherein the determining that one or more channel properties of the control channel and the shared channel are substantially the same comprises using the at least one of the RRC signaling or the signal.

24. The method of claim 23, wherein the at least one of the RRC signaling or the signal comprises one or more system parameters.

25. The method of claim 1, wherein the determining that one or more channel properties of the control channel and the shared channel are substantially the same is further based on a shared channel state associated with the RRC-configured resource set.

26. The method of claim 1, wherein processing the control channel and the shared channel comprises employing the same precoding for the control channel and the shared channel.

27. The method of claim 1, further comprising receiving signaling indicating whether the same precoding may be employed for the control channel and the shared channel.

28. The method of claim 27, wherein the signaling comprises an indication that an RRC-configured resource set is associated with the control channel.

29. The method of claim 1, wherein the determining that one or more channel properties of the control channel and the shared channel are substantially the same comprises determining if both the control channel and the shared channel are associated with the same non-zero power (NZP) channel state information reference signal (CSI-RS) resource.

30. An apparatus for wireless communications, comprising:
    a receiver configured to receive a control channel and a shared channel within a subframe; and
    a processing system configured to:
        determine that one or more channel properties of the control channel and the shared channel in the received subframe are substantially the same,
            wherein the one or more channel properties comprise at least one of a delay spread, a receive power, a frequency shift, a Doppler spread, or a receiver timing, and
            wherein the determination that the one or more channel properties of the control channel and the shared channel are substantially the same is based on a radio resource control (RRC)-configured resource set associated with the control channel;
        determine that the control channel and the shared channel are quasi co-located based on the determination that one or more channel properties of the control channel and the shared channel are substantially the same; and
        process the control channel and the shared channel based on the determination that the control channel and the shared channel are quasi co-located.

31. The apparatus of claim 30, wherein the control channel comprises an enhanced physical downlink control channel (ePDCCH).

32. The apparatus of claim 31, wherein the ePDCCH uses at least one of antenna ports 107-110.

33. The apparatus of claim 30, wherein the shared channel comprises a physical downlink shared channel (PDSCH).

34. The apparatus of claim 33, wherein the PDSCH uses at least one of antenna ports 7-14.

35. The apparatus of claim 30, wherein the processing system is configured to determine that the one or more channel properties of the control channel and the shared channel are substantially the same by receiving an explicit indication that the channel properties are substantially the same.

36. The apparatus of claim 35, wherein the explicit indication comprises at least one of radio resource control (RRC) signaling or a signal conveyed in the control channel.

37. The apparatus of claim 30, wherein the processing system is configured to determine that the one or more channel properties of the control channel and the shared channel are substantially the same by using an implicit indication that the channel properties are substantially the same.

38. The apparatus of claim 37, wherein using the implicit indication comprises determining that both the control channel and the shared channel use effectively the same cell identifiers (IDs) in the subframe.

39. The apparatus of claim 38, wherein each cell ID is a virtual cell ID, separately configured from a physical cell ID associated with a cell.

40. The apparatus of claim 30, wherein the processing system is configured to process the control channel and the shared channel by using the same channel estimation for both the control channel and the shared channel.

41. The apparatus of claim 40, wherein using the same channel estimation for both the control channel and the shared channel comprises using the same channel estimation for corresponding antenna ports between the control and shared channels.

42. The apparatus of claim 40, wherein using the same channel estimation comprises using the same channel estimation if corresponding resource blocks between the control and the shared channels belong to the same physical resource block pair.

43. The apparatus of claim 30, wherein the processing system is configured to process the control channel and the shared channel by using the same timing estimation for both the control channel and the shared channel.

44. The apparatus of claim 30, wherein the processing system is configured to process the control channel and the shared channel by using the same frequency estimation for both the control channel and the shared channel.

45. The apparatus of claim 30, wherein the processing system is configured to process the control channel and the shared channel by using the same Doppler spread estimation for both the control channel and the shared channel.

46. The apparatus of claim 30, wherein the processing system is further configured to determine that the one or more channel properties of the control channel and the shared channel are substantially the same based on one or more characteristics associated with at least one of the control channel or the shared channel.

47. The apparatus of claim 46, wherein the characteristics comprise at least one of a search space, a downlink control information (DCI) format, an aggregation level, decoding candidate within the aggregation level, closed loop beamforming, open loop beamforming, localized resource allocation, distributed resource allocation, a radio network temporary identifier (RNTI) type, or subframe indices associated with the control channel.

48. The apparatus of claim 46, wherein the characteristics comprise at least one of unicast transmission, broadcast transmission, closed loop beamforming, open loop beamforming, localized resource allocation, distributed resource allocation, a radio network temporary identifier (RNTI) type, or subframe indices associated with the shared channel.

49. The apparatus of claim 46, wherein the processing system is configured to determine that the one or more channel properties of the control channel and the shared channel are substantially the same if the shared channel is a broadcast channel.

50. The apparatus of claim 49, wherein the broadcast channel is scrambled by one of a paging radio network temporary identifier (RNTI), a system information RNTI, or a random access RNTI.

51. The apparatus of claim 30, wherein at least a first portion of the control channel or the shared channel is from a serving base station and at least a second portion of the control channel or the shared channel is from a non-serving base station.

52. The apparatus of claim 30, wherein the receiver is configured to receive at least one of radio resource control (RRC) signaling or a signal conveyed in the control channel indicating one of a set of RRC-configured states and wherein the processing system is configured to determine that the one or more channel properties of the control channel and the shared channel are substantially the same by using the at least one of the RRC signaling or the signal.

53. The apparatus of claim 52, wherein the at least one of the RRC signaling or the signal comprises one or more system parameters.

54. The apparatus of claim 30, wherein the processing system is further configured to determine that the one or more channel properties of the control channel and the shared channel are substantially the same based on a shared channel state associated with the RRC-configured resource set.

55. The apparatus of claim 30, wherein the processing system is configured to process the control channel and the shared channel by employing the same precoding for the control channel and the shared channel.

56. The apparatus of claim 30, wherein the receiver is further configured to receive signaling indicating whether the same precoding may be employed for the control channel and the shared channel.

57. The apparatus of claim 56, wherein the signaling comprises an indication that an RRC-configured resource set is associated with the control channel.

58. The apparatus of claim 30, wherein the processing system is configured to determine that the one or more channel properties of the control channel and the shared channel are substantially the same by determining if both the control channel and the shared channel are associated with the same non-zero power (NZP) channel state information reference signal (CSI-RS) resource.

59. An apparatus for wireless communications, comprising:
    means for receiving a control channel and a shared channel within a subframe;
    means for determining that one or more channel properties of the control channel and the shared channel in the received subframe are substantially the same,
        wherein the one or more channel properties comprise at least one of a delay spread, a receive power, a frequency shift, a Doppler spread, or a receiver timing, and
        wherein the means for determining is configured to determine that one or more channel properties of the control channel and the shared channel in the subframe are substantially the same based on a radio resource control (RRC)-configured resource set associated with the control channel;
    means for determining that the control channel and the shared channel are quasi co-located based on the determination that one or more channel properties of the control channel and the shared channel are substantially the same; and
    means for processing the control channel and the shared channel based on the determination that the control channel and the shared channel are quasi co-located.

60. The apparatus of claim 59, wherein the control channel comprises an enhanced physical downlink control channel (ePDCCH).

61. The apparatus of claim 60, wherein the ePDCCH uses at least one of antenna ports 107-110.

62. The apparatus of claim 59, wherein the shared channel comprises a physical downlink shared channel (PDSCH).

63. The apparatus of claim 62, wherein the PDSCH uses at least one of antenna ports 7-14.

64. The apparatus of claim 59, wherein the means for determining that one or more channel properties of the control channel and the shared channel are substantially the same is configured to receive an explicit indication that the channel properties are substantially the same.

65. The apparatus of claim 64, wherein the explicit indication comprises at least one of radio resource control (RRC) signaling or a signal conveyed in the control channel.

66. The apparatus of claim 59, wherein the means for determining that one or more channel properties of the control channel and the shared channel are substantially the same is configured to use an implicit indication that the channel properties are substantially the same.

67. The apparatus of claim 66, wherein using the implicit indication comprises determining that both the control channel and the shared channel use effectively the same cell identifiers (IDs) in the subframe.

68. The apparatus of claim 67, wherein each cell ID is a virtual cell ID, separately configured from a physical cell ID associated with a cell.

69. The apparatus of claim 59, wherein the means for processing the control channel and the shared channel is configured to use the same channel estimation for both the control channel and the shared channel.

70. The apparatus of claim 69, wherein using the same channel estimation for both the control channel and the shared channel comprises using the same channel estimation for corresponding antenna ports between the control and shared channels.

71. The apparatus of claim 69, wherein using the same channel estimation comprises using the same channel estimation if corresponding resource blocks between the control and the shared channels belong to the same physical resource block pair.

72. The apparatus of claim 59, wherein the means for processing the control channel and the shared channel is configured to use the same timing estimation for both the control channel and the shared channel.

73. The apparatus of claim 59, wherein the means for processing the control channel and the shared channel is configured to use the same frequency estimation for both the control channel and the shared channel.

74. The apparatus of claim 59, wherein the means for processing the control channel and the shared channel is configured to use the same Doppler spread estimation for both the control channel and the shared channel.

75. The apparatus of claim 59, wherein the means for determining that one or more channel properties of the control channel and the shared channel are substantially the same is further configured to determine that the one or more channel properties of the control channel and the shared channel are substantially the same based on one or more characteristics associated with at least one of the control channel or the shared channel.

76. The apparatus of claim 75, wherein the characteristics comprise at least one of a search space, a downlink control information (DCI) format, an aggregation level, decoding candidate within the aggregation level, closed loop beamforming, open loop beamforming, localized resource allocation, distributed resource allocation, a radio network temporary identifier (RNTI) type, or subframe indices associated with the control channel.

77. The apparatus of claim 75, wherein the characteristics comprise at least one of unicast transmission, broadcast transmission, closed loop beamforming, open loop beamforming, localized resource allocation, distributed resource allocation, a radio network temporary identifier (RNTI) type, or subframe indices associated with the shared channel.

78. The apparatus of claim 75, wherein the means for determining that one or more channel properties of the control channel and the shared channel are substantially the same is configured to determine that the one or more channel properties of the control channel and the shared channel are substantially the same if the shared channel is a broadcast channel.

79. The apparatus of claim 78, wherein the broadcast channel is scrambled by one of a paging radio network temporary identifier (RNTI), a system information RNTI, or a random access RNTI.

80. The apparatus of claim 59, wherein at least a first portion of the control channel or the shared channel is from a serving base station and at least a second portion of the control channel or the shared channel is from a non-serving base station.

81. The apparatus of claim 59, wherein the means for receiving is configured to receive at least one of radio resource control (RRC) signaling or a signal conveyed in the control channel indicating one of a set of RRC-configured states and wherein the means for determining that one or more channel properties of the control channel and the shared channel are substantially the same is configured to use the at least one of the RRC signaling or the signal.

82. The apparatus of claim 81, wherein the at least one of the RRC signaling or the signal comprises one or more system parameters.

83. The apparatus of claim 59, wherein the means for determining that one or more channel properties of the control channel and the shared channel are substantially the same is further configured to determine that one or more channel properties of the control channel and the shared channel in the subframe are substantially the same based on a shared channel state associated with the RRC-configured resource set.

84. The apparatus of claim 59, wherein processing the control channel and the shared channel comprises employing the same precoding for the control channel and the shared channel.

85. The apparatus of claim 59, wherein the means for receiving is further configured to receive signaling indicating whether the same precoding may be employed for the control channel and the shared channel.

86. The apparatus of claim 85, wherein the signaling comprises an indication that an RRC-configured resource set is associated with the control channel.

87. The apparatus of claim 59, wherein the means for determining that one or more channel properties of the control channel and the shared channel are substantially the same is configured to determine if both the control channel and the shared channel are associated with the same non-zero power (NZP) channel state information reference signal (CSI-RS) resource.

88. A non-transitory computer-readable medium comprising code for:
receiving a control channel and a shared channel within a subframe;
determining that one or more channel properties of the control channel and the shared channel in the received subframe are substantially the same,
wherein the one or more channel properties comprise at least one of a delay spread, a receive power, a frequency shift, a Doppler spread, or a receiver timing, and
wherein the determining is based on a radio resource control (RRC)-configured resource set associated with the control channel;
determining that the control channel and the shared channel are quasi co-located based on the determination that one or more channel properties of the control channel and the shared channel are substantially the same; and
processing the control channel and the shared channel based on the determination that the control channel and the shared channel are quasi co-located.

89. The non-transitory computer-readable medium of claim 88, wherein the control channel comprises an enhanced physical downlink control channel (ePDCCH).

90. The non-transitory computer-readable medium of claim 89, wherein the ePDCCH uses at least one of antenna ports 107-110.

91. The non-transitory computer-readable medium of claim 88, wherein the shared channel comprises a physical downlink shared channel (PDSCH).

92. The non-transitory computer-readable medium of claim 91, wherein the PDSCH uses at least one of antenna ports 7-14.

93. The non-transitory computer-readable medium of claim 88, wherein determining that the one or more channel properties of the control channel and the shared channel are substantially the same comprises receiving an explicit indication that the channel properties are substantially the same.

94. The non-transitory computer-readable medium of claim 93, wherein the explicit indication comprises at least one of radio resource control (RRC) signaling or a signal conveyed in the control channel.

95. The non-transitory computer-readable medium of claim 88, wherein determining that the one or more channel properties of the control channel and the shared channel are substantially the same comprises using an implicit indication that the channel properties are substantially the same.

96. The non-transitory computer-readable medium of claim 95, wherein using the implicit indication comprises determining that both the control channel and the shared channel use effectively the same cell identifiers (IDs) in the subframe.

97. The non-transitory computer-readable medium of claim 96, wherein each cell ID is a virtual cell ID, separately configured from a physical cell ID associated with a cell.

98. The non-transitory computer-readable medium of claim 88, wherein processing the control channel and the shared channel comprises using the same channel estimation for both the control channel and the shared channel.

99. The non-transitory computer-readable medium of claim 98, wherein using the same channel estimation for both the control channel and the shared channel comprises using the same channel estimation for corresponding antenna ports between the control and shared channels.

100. The non-transitory computer-readable medium of claim 98, wherein using the same channel estimation comprises using the same channel estimation if corresponding resource blocks between the control and the shared channels belong to the same physical resource block pair.

101. The non-transitory computer-readable medium of claim 88, wherein processing the control channel and the shared channel comprises using the same timing estimation for both the control channel and the shared channel.

102. The non-transitory computer-readable medium of claim 88, wherein processing the control channel and the shared channel comprises using the same frequency estimation for both the control channel and the shared channel.

103. The non-transitory computer-readable medium of claim 88, wherein processing the control channel and the shared channel comprises using the same Doppler spread estimation for both the control channel and the shared channel.

104. The non-transitory computer-readable medium of claim 88, wherein determining that the one or more channel properties of the control channel and the shared channel are substantially the same is further dependent on one or more characteristics associated with at least one of the control channel or the shared channel.

105. The non-transitory computer-readable medium of claim 104, wherein the characteristics comprise at least one of a search space, a downlink control information (DCI) format, an aggregation level, decoding candidate within the aggregation level, closed loop beamforming, open loop beamforming, localized resource allocation, distributed resource allocation, a radio network temporary identifier (RNTI) type, or subframe indices associated with the control channel.

106. The non-transitory computer-readable medium of claim 104, wherein the characteristics comprise at least one of unicast transmission, broadcast transmission, closed loop beamforming, open loop beamforming, localized resource allocation, distributed resource allocation, a radio network temporary identifier (RNTI) type, or subframe indices associated with the shared channel.

107. The non-transitory computer-readable medium of claim 104, wherein the determining that one or more channel properties of the control channel and the shared channel are substantially the same comprises determining that the one or more channel properties of the control channel and the shared channel are substantially the same if the shared channel is a broadcast channel.

108. The non-transitory computer-readable medium of claim 107, wherein the broadcast channel is scrambled by one of a paging radio network temporary identifier (RNTI), a system information RNTI, or a random access RNTI.

109. The non-transitory computer-readable medium of claim 88, wherein at least a first portion of the control channel or the shared channel is from a serving base station and at least a second portion of the control channel or the shared channel is from a non-serving base station.

110. The non-transitory computer-readable medium of claim 88, further comprising code for receiving at least one of radio resource control (RRC) signaling or a signal conveyed in the control channel indicating one of a set of RRC-configured states, wherein the determining that one or more channel properties of the control channel and the shared channel are substantially the same comprises using the at least one of the RRC signaling or the signal.

111. The non-transitory computer-readable medium of claim 110, wherein the at least one of the RRC signaling or the signal comprises one or more system parameters.

112. The non-transitory computer-readable medium of claim 88, wherein the determining that one or more channel properties of the control channel and the shared channel are substantially the same is further based on a shared channel state associated with the RRC-configured resource set.

113. The non-transitory computer-readable medium of claim 88, wherein processing the control channel and the shared channel comprises employing the same precoding for the control channel and the shared channel.

114. The non-transitory computer-readable medium of claim 88, further comprising code for receiving signaling indicating whether the same precoding may be employed for the control channel and the shared channel.

115. The non-transitory computer-readable medium of claim 114, wherein the signaling comprises an indication that an RRC-configured resource set is associated with the control channel.

116. The non-transitory computer-readable medium of claim 88, wherein the determining that one or more channel properties of the control channel and the shared channel are substantially the same comprises determining if both the control channel and the shared channel are associated with the same non-zero power (NZP) channel state information reference signal (CSI-RS) resource.

* * * * *